(12) United States Patent
Reinelt et al.

(10) Patent No.: US 6,899,248 B2
(45) Date of Patent: May 31, 2005

(54) FUEL TANK

(75) Inventors: Georg Reinelt, Bonn (DE); Jörg Koith, Troisdorf (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 82 days.

(21) Appl. No.: 10/237,423

(22) Filed: Sep. 9, 2002

(65) Prior Publication Data

US 2003/0047563 A1 Mar. 13, 2003

(30) Foreign Application Priority Data

Sep. 10, 2001 (DE) .......................... 101 44 543
Aug. 1, 2002 (EP) ............................. 02017286

(51) Int. Cl.[7] .............................................. B65D 88/12
(52) U.S. Cl. .................................. 220/562; 220/4.13
(58) Field of Search .................. 220/4.13, 562–564, 220/601, 661, 86.2, 86.3, 4.14; 123/518, 519

(56) References Cited

U.S. PATENT DOCUMENTS

| 4,591,319 | A | | 5/1986 | Takahashi et al. |
| 4,651,701 | A | | 3/1987 | Weaver |
| 5,116,257 | A | * | 5/1992 | Szlaga ...................... 137/43 |
| 5,404,907 | A | * | 4/1995 | Benjey et al. ............ 137/587 |
| 5,992,441 | A | | 11/1999 | Enge et al. |
| 6,058,963 | A | | 5/2000 | Enge et al. |
| 6,308,735 | B1 | * | 10/2001 | Foltz ....................... 137/587 |
| 6,679,282 | B2 | * | 1/2004 | Aoki et al. ............... 137/202 |

FOREIGN PATENT DOCUMENTS

| GB | 2284581 | 6/1995 |
| JP | 09195876 | 7/1997 |

* cited by examiner

Primary Examiner—Joseph C. Merek
(74) Attorney, Agent, or Firm—Grossman Tucker Perreault & Pfleger, PLLC

(57) ABSTRACT

A device for fixing a functional component within a fuel tank that makes use of an opening in the tank wall of the fuel tank. The device comprises at least one connecting element for receiving the functional component, with the connecting element being latched in an opening in the tank body wall, in a position of passing therethrough. The opening is sealingly closed at the outside of the tank by a closure member or a cover cap or a connection portion can be fitted to the opening for the connection thereto of a device intended to communicate with the tank interior.

20 Claims, 4 Drawing Sheets

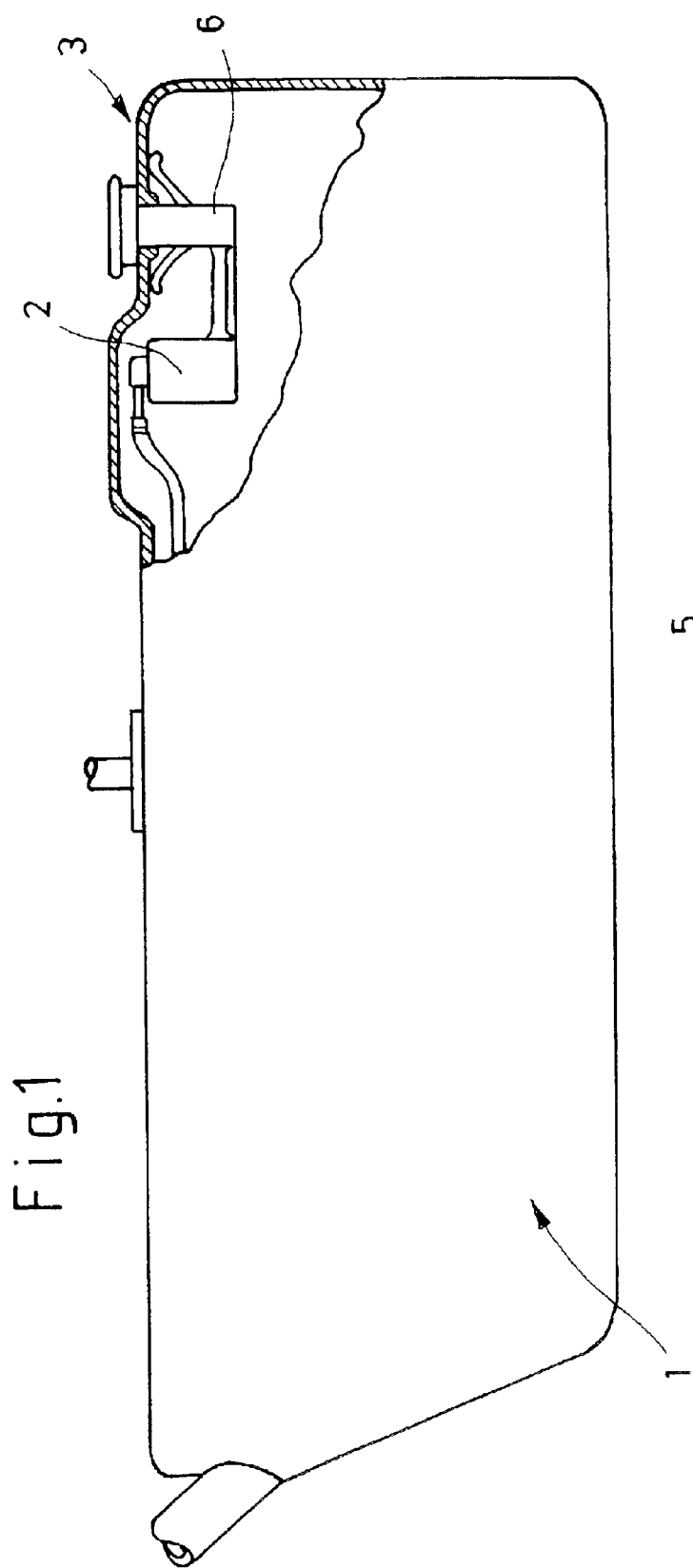
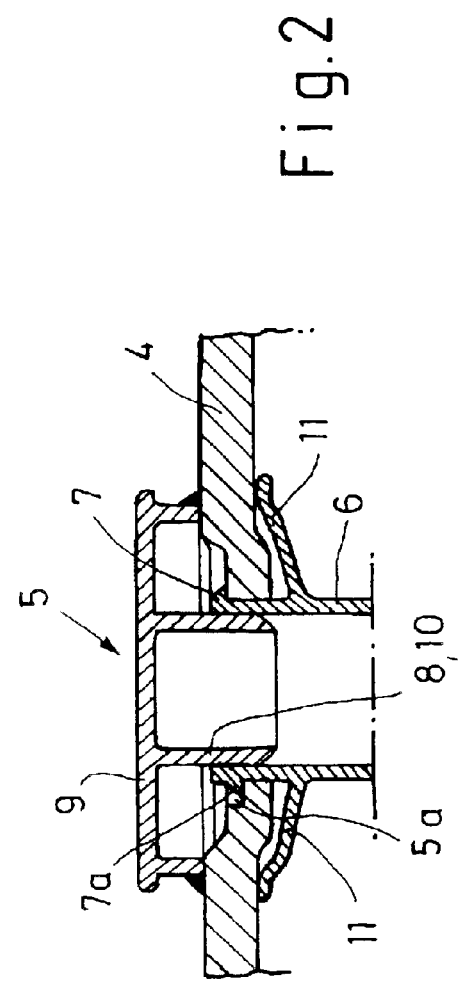

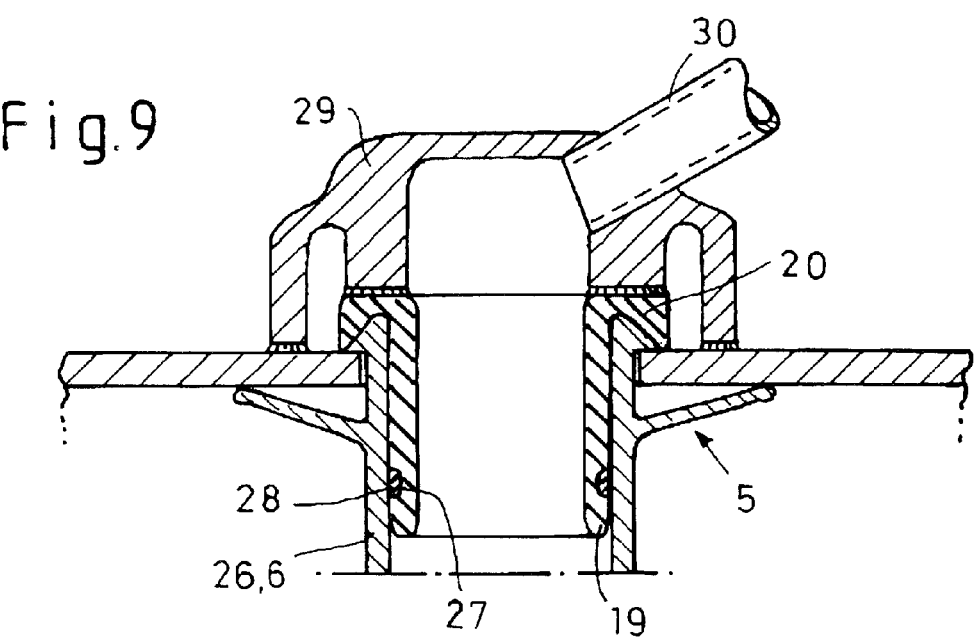
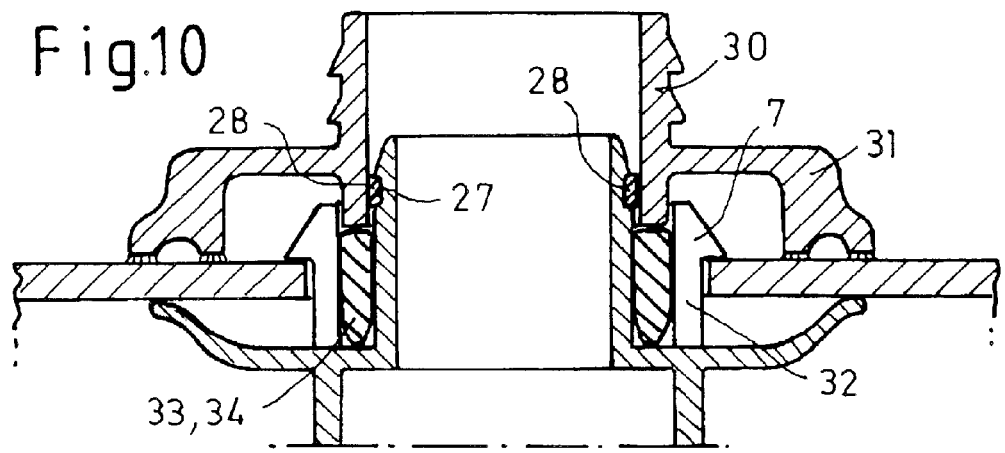
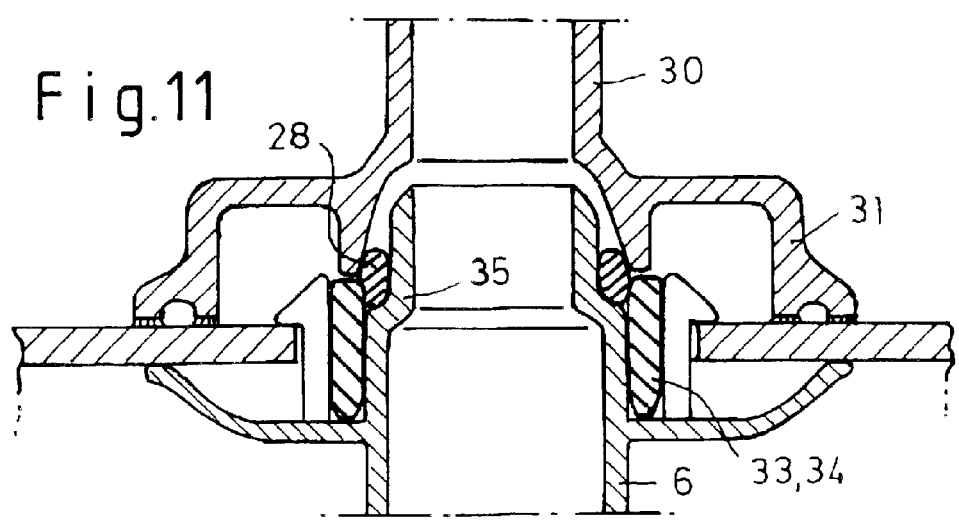

FUEL TANK

FIELD OF THE INVENTION

The invention concerns a fuel tank and more particularly a fuel tank of plastic material, for example for a motor vehicle.

BACKGROUND OF THE INVENTION

Particularly in regard to the manufacture of, and the fitment of components to, fuel tanks of plastic material which are produced by extrusion blow molding, the installation of functional components and holding them in the appropriate position often gives rise to problems. Such functional components that may be considered include for example vent valves, roll-over valves, senders, lines and the like. Those components have to be positioned and fixed within the fuel tank. As fuel tanks of plastic material are to be very substantially impermeable and sealed in relation to liquid hydrocarbons it is not possible to envisage the use of fixing procedures in which the tank wall has to be violated. For that reason therefore such components are generally welded with special holders to the inside wall surface of the fuel tank, more specifically generally in the immediate proximity of a relatively large assembly opening in the fuel tank. Finally, an assembly opening which is then to be welded shut so as to afford gas-tight and liquid-tight sealing integrity can also serve to accommodate holders for functional components of that nature.

Openings which are systematically provided in a fuel tank and which could serve for fixing functional components in position, such as for example an assembly opening or a filler opening should be reduced if possible to a minimum as such openings constitute potential weak points in the system in terms of sealing integrity.

SUMMARY OF THE INVENTION

An object of the invention is to provide a fuel tank comprising plastic material which is improved in terms of fixing options for functional components within the tank.

Another object of the invention is to provide a fuel tank produced from plastic material by an extrusion blow molding procedure, which affords an enhanced degree of versatility in regard to fixing components to the tank without adversely affecting the sealing integrity thereof to any significant degree.

In accordance with the principles of the present invention therefore the foregoing and other objects are attained by a fuel tank of plastic material comprising at least one holder for fixing functional components in the interior of the tank, wherein the holder has at least one connecting element for receiving the functional component or the connecting element is in the form of a constituent part of the functional component. The connecting element is held in latching engagement in an opening in a wall in the tank, in a position of passing therethrough. The opening is closed off at the outside of the tank with respect to the atmosphere by a closure in the form of a cover or a cover cap, or the opening is provided with a connection component or portion, for example for connecting another external component thereto.

As will become apparent from the description hereinafter of preferred embodiments and configurations in accordance with the invention the invention advantageously makes use of the fact that plastic fuel tanks which are produced by extrusion blow molding generally tend in any case to have openings in the tank wall without those being systematically planned to occur therein. Such openings for example involve openings produced by blowing needles or blowing bars which are operative for example to expand a blank within an extrusion blow molding mold, during the molding procedure. Such openings have to be subsequently closed off if an opening were not in any case intended to be provided at the location thereof.

The present invention now makes use of that opening for the purposes of fixing at least one functional component within the fuel tank. The invention thus provides that fitted into those openings is an adaptor acting as the above-mentioned connecting element which for example can be latched to the functional component. Alternatively the adaptor or connecting element can be formed in one piece with the functional component.

A preferred feature of the invention provides that the closure or the connection component is welded to the wall of the fuel tank.

In a further preferred feature, for the purposes of latching engagement in the opening in the wall of the tank the connecting element can be provided at its outside periphery with latching or detent elements which engage behind the wall of the tank in positively locking relationship in the position of installation thereof.

It will be noted that a connecting element of such a design configuration with the functional component arranged thereon or fixed thereto can be fitted in the tank through an assembly opening of the tank from the interior thereof.

Preferably for that purpose the connecting element is in the form of a substantially tubular member which is open at an end and which at its outside periphery has resiliently yielding wall portions, wherein snap-engagement noses or projections are provided on those wall portions, to act as latching or detent elements. The connecting element can have been inserted from the interior into the respective opening in the wall of the tank in such a way that the latching or detent elements engage behind the wall of the tank on the outside thereof.

Desirably, fitted into the open end of the connecting element, in the position of installation thereof, is a securing element which provides for locking the latching or detent elements in the position of engaging behind the wall of the tank.

The securing element can be for example in the form of a spreading element which is to be inserted into the end opening of the connecting element.

In another preferred feature of the invention the tank has at least one counter-holding or bracing means for axially fixing the connecting element in its position of installation.

In the simplest case in that respect for example the closure can be formed at the same time as the counter-holding means.

Alternatively the counter-holding means can be in the form of resilient support legs or a correspondingly designed support collar or flange at the outside periphery of the connecting element, being arranged in such a way that the legs or flange brace the connecting element in the position of installation thereof in a biased condition against the inside surface of the wall of the tank.

Preferably, the support legs or the support collar can be arranged on the outside periphery of the connecting element in such a way that they are disposed in a defined reference plane relative to the outside skin of the fuel tank. That makes it possible on the one hand to fix the functional component in position independently of the wall thickness of the fuel tank, while on the other hand it is also possible to compensate for or bridge over accumulations of material at the inside surface of the wall of the tank, which were caused for example by a blowing needle penetrating through the material at such a location.

Another preferred feature of the invention provides that the counter-holder is in the form of a support plate which co-operates with a support cover fitted into the open end of the connecting element, by way of a tension or tie element which connects the support plate and the support cover. The support plate is thereby braced in a biased condition against the wall of the tank by the tie element. The support plate can preferably be made for example in the form of a metal component while the tie element can be a blind rivet which was introduced from the outside through openings in mutually aligned opposite relationship in the support cover and the support plate. In that case the support plate serves at the same time as a securing element or as a spreading element.

At its outside periphery, on its side towards the inside surface of the wall of the tank, the support plate can be provided with claws which advantageously dig into the inside surface of the tank.

Another preferred configuration of the invention provides that the securing element is connected to the closure in the form of a cover cap. It can be formed integrally with the cover cap, or alternatively it can be provided that the cover cap was suitably welded to the spreading element fitted into the connecting element, more specifically at the same time as the operation of welding it to the outside wall of the fuel tank.

The latching or detent elements at the outside periphery of the connecting element can co-operate with corresponding recesses or apertures in the opening in the wall of the tank in such a way as to guarantee unique orientation of the connecting element in the peripheral direction, thus affording a form of coding configuration or indexing effect, and this may be found to be important for example when arranging filling level-limiting valves in the fuel tank.

A further embodiment of the invention can provide that the connection component is in the form of a connection nipple, with the connecting element and the functional component communicating with each other. In this case the functional component can be for example in the form of a vent valve, wherein the opening in the outside of the container in this case serves both for fixing the functional component in place and also for passing therethrough the vent conduit which is required in any case.

The above-outlined arrangement substantially simplifies in particular blind fitment of conduits which are to be passed out of the fuel tank. Hitherto it was necessary for the conduits in question to be fitted blind by hand within the fuel tank on to a nipple which was accessed from the exterior through an opening in the tank. The above-outlined embodiment of the fuel tank according to the invention provides that it is possible to implement pre-assembly of hoses and connection elements and/or functional components, outside the fuel tank, as already described hereinbefore.

Alternatively it can be provided that the connection component is in the form of a cover cap with a connection nipple, in which case also the connecting element and the functional component communicate with each other.

A further variant of the fuel tank according to the invention can provide that the connection component can be in the form of a sleeve which is fitted into the connecting element and which has a peripherally extending collar portion as a fixing flange for a further connection component. The sleeve for example can comprise a plastic material which is weldable to the connection component and the properties of which differ from the plastic material constituting the functional component. Functional components such as valves generally consist of polyoxymethylene, often abbreviated to POM, which does not swell in the presence of hydrocarbons but which is not weldable to the wall of the tank.

Further objects, features and advantages of the invention will be apparent from the description hereinafter of preferred embodiments of a fuel tank according to the invention.

BRIEF DESCRIPTION OF THE DRAWINGS

FIG. 1 is a partly sectional overall view of a fuel tank according to the invention, FIG. 2 is a view in section on an enlarged scale of part of the fuel tank according to the invention in the region of a holder fitted thereinto in accordance with a first embodiment of the invention, FIG. 9 is a view in section through a holder in accordance with a seventh embodiment, FIG. 10 is a view in section through a holder in accordance with a eighth embodiment, and FIG. 11 is a view in section through a holder in accordance with a ninth embodiment.

DESCRIPTION OF THE PREFERRED EMBODIMENTS

Figure 3:
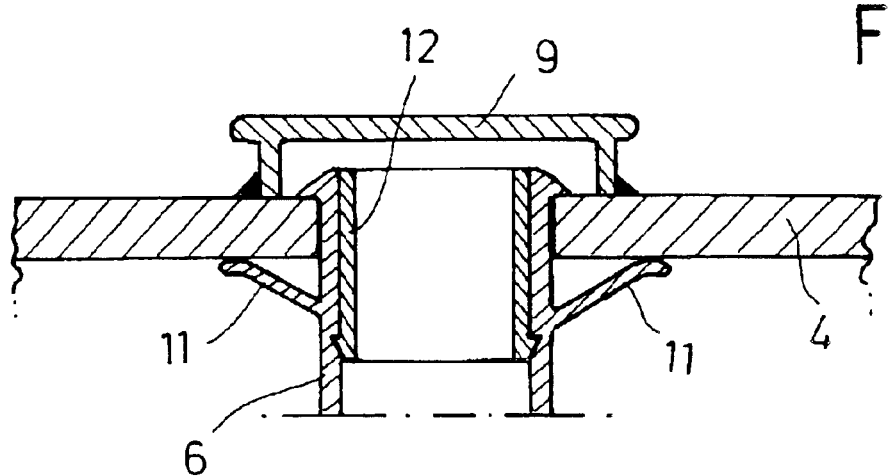
FIG. 3 is a view in section through a holder in accordance with a second embodiment.

Referring firstly to FIG. 1, reference numeral 1 therein generally denotes a plastic fuel tank for example for a motor vehicle which is of a substantially one-piece configuration and was produced by extrusion blow molding from suitable thermoplastic material.

Reference numeral 2 in FIG. 1 denotes a roll-over valve which is positioned within the fuel tank 1 and which is fixed by way of a holder generally indicated at 3 to or in the tank wall as indicated by reference 4 for example in FIG. 2.

Looking now also at FIG. 2 reference 5 therein denotes an opening which is used in the tank wall for fitting the roll-over valve and which has remained in the tank wall in the form of a penetration hole through which a blowing needle penetrated into the tank in the course of the blow molding procedure. The opening 5 is now used in accordance with the invention to receive a connecting element 6 of the holder 3. The entire holder 3 is also predominantly made from thermoplastic material, and can have been produced for example by injection molding. As can be clearly seen from FIG. 1 the connecting element 6, at its end remote from the tank wall 4, is integrally connected to the roll-over valve 2. It can alternatively be provided that those two parts are secured together by latching or detent engagement or by a clipping action or also by screw means.

Referring to FIG. 2, the embodiment illustrated therein includes at the outside periphery of the connecting element 6 a positioning nose 7a which engages into a recess 5a, which approximately corresponds to the size of the positioning nose 7a, in the outside of the tank wall 4, at the edge of the opening 5. The positioning nose 7a and the recess 5a serve to hold the connecting element 6 in position in non-rotational relationship with respect to the body of the tank in order to ensure a unique orientation thereof in the peripheral direction of the connecting element 6, thus affording a coding or indexing effect.

The connecting element 6 is in the form of a tubular member which is open at an end and which at its outside periphery is provided with a plurality of snap-engagement noses 7 which in the position of installation of the connecting element 6 engage behind a part of the outside wall surface of the tank in positively locking engagement, as can be seen for example in FIG. 2. The wall portions in question of the connecting element 6 are of a resiliently yielding nature, for example due to the provision of slots which extend in the connecting element 6 in the axial direction thereof so that the connecting element 6 can be inserted into the opening 5 with the snap-engagement noses 7 leading, from the interior of the tank.

For the purposes of securing the snap-engagement noses 7 acting as the latching elements in the illustrated position of suitably engaging behind the tank wall 4, the illustrated embodiment has a spreading element generally indicated at 8 which is to be introduced into the connecting element 6 at an end thereof. In the case of the first embodiment of the arrangement as shown in FIG. 2 the spreading element 8 is in the form of a cylindrical plug or stopper formed in one piece with a cover cap 9 for sealing off the opening 5. The cover cap 9 is welded to the outside surface of the tank wall 4, by way of the end face of the illustrated rim portion of the cover cap, which faces towards the tank wall 4. In that position, the projection 10 on the cover cap 9, which is in the form of a stub portion, projects into the connecting element 6 which is open at the end thereof and secures the snap-engagement noses 7 into their position of engaging behind the outside surface of the tank wall 4.

The tank wall 4 preferably comprises a multi-layer extrudate having one or more barrier layers for hydrocarbons, in which respect the outer skin or outermost layer of the tank wall 4 can for example comprise PE. In this case the cover cap 9 would also be made from PE in order to ensure that it can be suitably welded to the tank wall 4. In comparison the connecting element 6 can comprise a material which is not weldable to the tank wall 4, for example POM. For the purposes of axially securing the connecting element 6 in relation to the tank wall 4, the connecting element 6 carries a plurality of support legs 11 extending radially therefrom, at a spacing from the snap-engagement noses 7, in the axial direction of the connecting element 6. In the simplest case there can be just two support legs 11 but it is also possible for more than two support legs 11 to be arranged distributed uniformly around the periphery of the connecting element 6. The support legs 11 act as a counter-holding or bracing means and brace the connecting element 6 in a biased condition against the inside surface of the tank wall. In order to ensure latching engagement of the connecting element 6 in a biased condition the support legs 11 are also of a resilient nature. The spacing of the support legs 11 relative to the snap-engagement noses 7 is so selected as to guarantee that the connecting element 6 is securely seated in place, when the tank wall 4 involves different wall thicknesses. Thus, a defined condition of contact is ensured with respect to the contact of the snap-engagement noses 7 against the outside surface of the fuel tank without the connecting element 6 being capable of displacement within the opening 5.

The support legs 11 also have the advantage that, as is clearly visible from FIG. 2, they can bridge over any unevenness or accumulations of material in the region of the mouth of the opening 5 in the interior of the tank.

Reference will now be made to FIG. 3 showing a second embodiment of a fuel tank according to the invention in which a spreading element in the form of a tube portion 12 is inserted into the connecting element 6. In other respects the arrangement shown in FIG. 3 corresponds to that illustrated in FIG. 2.

Figure 4:
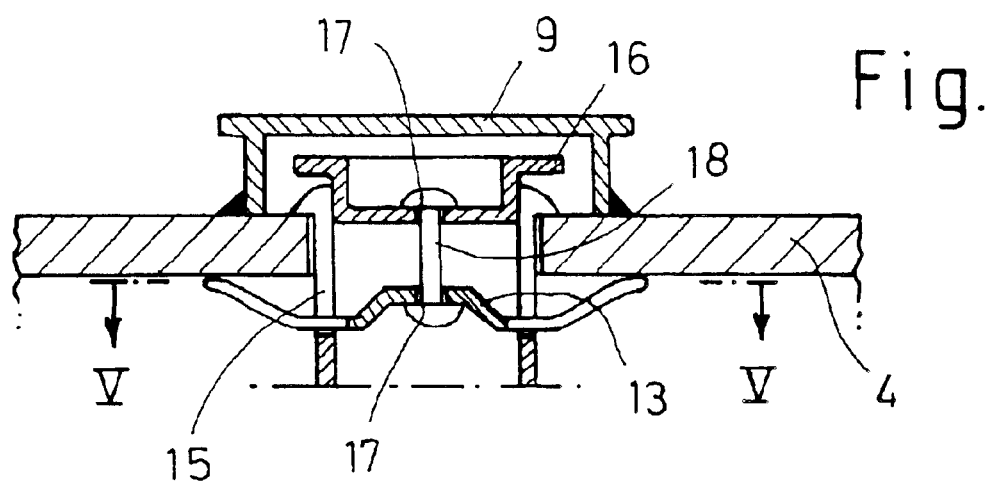
FIG. 4 is a view in section through a holder in accordance with a third embodiment.
Figure 5:
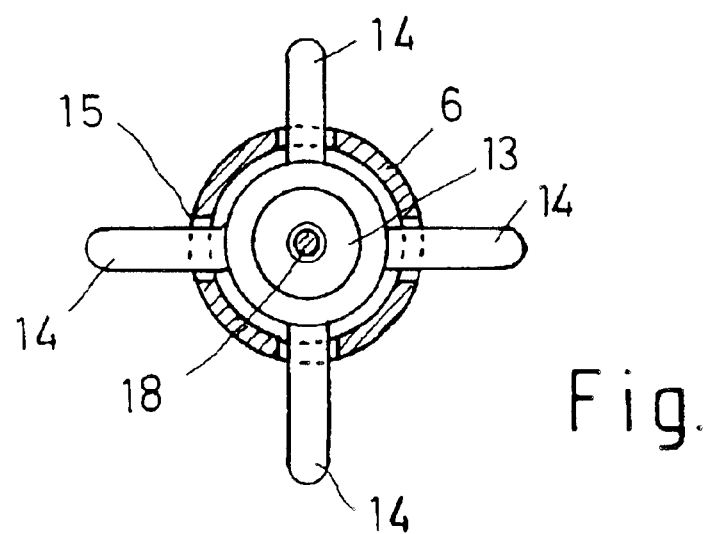
FIG. 5 is a view in section taken along line V—V in FIG. 4.

FIGS. 4 and 5 show a third embodiment of the invention which has a counter-holding means or bracing means in the form of a metal support plate 13 provided at its periphery with radially outwardly extending claw-shaped projections 14. The support plate 13 is fitted at the end into the connecting element 6, with the support plate 13 being guided displaceably by way of the projections 14 in suitably dimensioned recesses 15 extending in the axial direction of the connecting element 6. The number of recesses 15 correspond to the number of projections 14. It will be seen that the recesses 15 extend in the longitudinal direction of the connecting element 6, at the end thereof which is provided with the snap-engagement noses 7. The width of the recesses 15 approximately corresponds to the width of the projections 14 or is immaterially larger than same. The spreading element in this embodiment is in the form of a support cover 16 which is to be inserted into the open end of the connecting element 6. The support cover 16 and the support plate 13 are each provided with a bore 17, the bores 17 being aligned with each other in the position of installation of the components illustrated.

Fitment of the holder 3 shown in FIGS. 4 and 5 is firstly implemented, as in the case of the above-described holders, by inserting the connecting element 6 into the opening 5 from the interior of the tank, more specifically with the support plate 13 fitted into the connecting element 6 at the end thereof. The support cover 16 is then fitted on, from the outside. A tension or tie element in the form of a blind rivet 18 is then inserted through the bores 17 in the support plate 13 and the support cover 16 and pulls the support cover 16 and the support plate 13 towards each other. In that situation, the support plate 13 or the claw-shaped projections thereof are pressed in a biased condition against the inside wall surface of the fuel tank 1 and at the same time the support cover 16 is secured in the opening at the end of the connecting element 6. The cover 9 is then welded to the outside surface of the wall of the fuel tank 1. The advantage of this kind of connection is that it can scarcely still be disengaged without involving a considerable amount of time and expenditure and that the hooking engagement of the claw-shaped projections 14 by digging into the tank wall 4 at the inside surface thereof ensures that the functional component, in this case the above-mentioned roll-over valve 2, is sufficiently secured in its peripheral direction.

Figure 6:
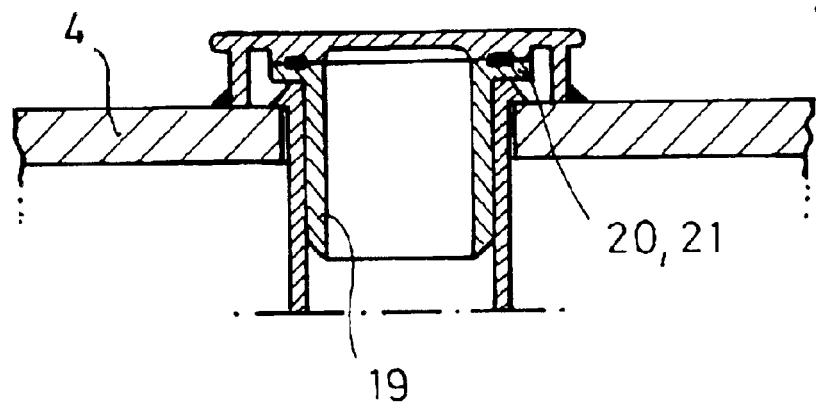
FIG. 6 is a view in section through a holder in accordance with a fourth embodiment.

FIG. 6 shows a further alternative configuration of the holder 3. In this case the holder 3 has a spreading element in the form of a sleeve 19 which is fitted into the connecting element 6 at the end thereof, the sleeve 19 being provided with a peripherally extending collar portion 20 forming a welding surface 21 for welding to the cover cap indicated at 9 in for example FIGS. 2 through 4. This provides both for axially securing the connecting element 6 and also sealing off the opening 5 by way of the cover cap 9.

Figure 7:
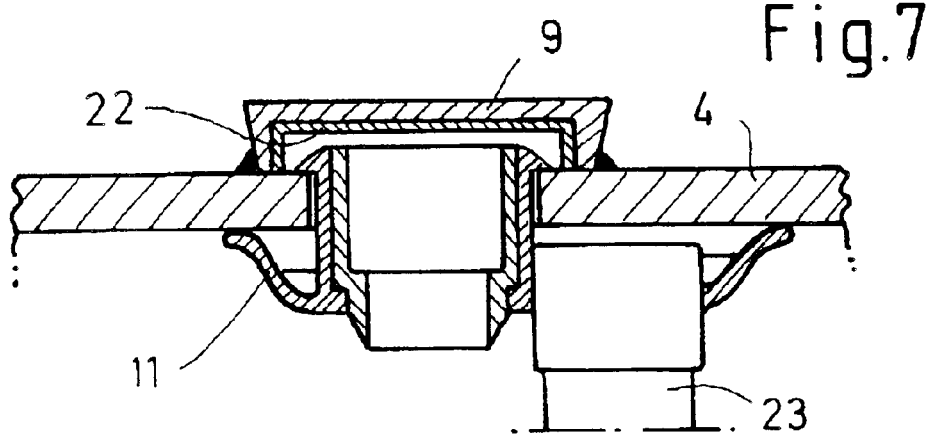
FIG. 7 is a view in section through a holder in accordance with a fifth embodiment.

In the further embodiment illustrated in FIG. 7 the cover cap 9 is in the form of a two-component cover comprising an inner aluminum cover portion 22. In addition a functional component as is diagrammatically indicated at 23 is secured laterally to the connecting element 6, in a similar manner to that also shown for example in FIG. 1. Alternatively it can be provided that the connecting element 6, on its side which is towards the interior of the fuel tank, is in the form of a plug adaptor for positively lockingly receiving a functional component.

Figure 8:
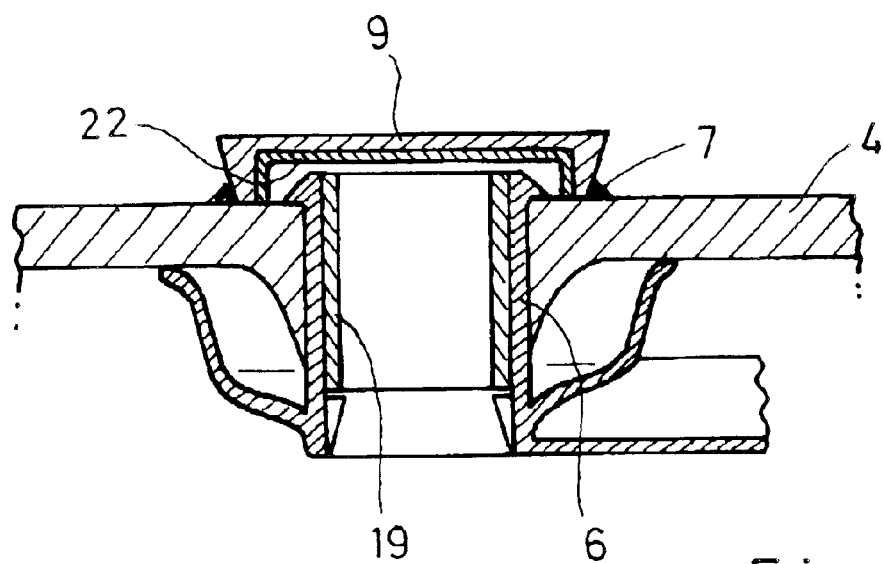
FIG. 8 is a view in section through a holder in accordance with a sixth embodiment.

Referring to FIG. 8 shown therein is an embodiment in which the holder 3 is inserted into a blow needle hole in the wall of the fuel tank, in which respect it is clearly visible that the thickness of the tank wall 4 is markedly increased in the region directly adjoining the connecting element 6, by virtue of the insertion action. The support legs 11 are of such a configuration as to extend outwardly to a suitably great distance, so that the contact points thereof against the inside surface of the tank wall 4 are at a spacing from the edge of the opening in the tank wall 4, which spacing corresponds at least to half the diameter of the connecting element 6.

It will be readily apparent also to a specialist in the art that the opening in the tank wall 4, as indicated for example by reference 5 in FIG. 2, can also be provided in the region of a trough or depression formed in the outside surface of the tank wall 4. In that case, instead of a cover cap as indicated for example at 9, the arrangement may have a cover which completely closes the trough or depression and which is preferably welded to the outside of the tank wall 4.

Reference will now be directed generally to FIGS. 9 through 11 showing embodiments which differ from the embodiments described hereinbefore insofar as the tank wall 4 is not closed by a cover cap or the like, but it forms a sealingly closed aperture for a line or conduit which is to be passed out of the fuel tank.

Referring therefore more specifically to FIG. 9 the structure shown therein has a functional component 23 in the form of a vent valve comprising a valve housing and a valve housing fixing 26. The valve housing fixing serves as a connecting element 6 and is latched in the opening 5 in the manner described hereinbefore. As in the embodiment shown in FIG. 6, the securing element involved here is in the form of a sleeve 19 which in its outside periphery has a peripherally extending groove 27 with an O-ring seal 28 accommodated therein. In this case, a seal is afforded between the sleeve 19 on the one hand and the valve housing fixing 26 on the other hand, for reasons related to the function of the assembly. It will be self-evident to a specialist in the art that such a sealing effect can also be achieved by adopting suitable tolerances in respect of the sleeve 19, for example with a very close fit. The O-ring seal 28 in the groove 27 bears sealingly against the inside wall surface of the connecting element 6 or valve housing fixing 26.

Provided at the end of the sleeve 19, which is remote from the valve housing 25, is a peripherally extending collar portion 20 which additionally serves as a fixing flange for a cover cap 29. The cover cap 29 is additionally welded at its edge to the tank wall 4. As will be readily apparent from FIG. 9 the position of the weld surfaces is so selected that automated fitment of the cover cap 29 is readily possible, if some alignment errors in terms of the orientation thereof can be accepted. The cover cap 29 is not a closure member in the sense of the embodiments of the invention as described hereinbefore, but rather it is provided in the form of a connection component with a connection element as indicated at 30. It is then possible to connect to the connection element 30 for example a vent conduit (not shown) leading to a fuel vapor filter. The connection element can be a connection nipple, a connection screwthread or other suitable structure for that purpose.

In the case of the embodiment shown in FIG. 9 it will be appreciated that the valve housing which is not shown here, the valve housing fixing 26 and the cover cap 29 communicate with each other. The opening 5 in the tank wall 4 is used both for fitting the valve housing and for implementing tank venting.

In the embodiment shown in FIG. 10 the connecting element 6 is passed clearly through the opening 5 in the tank wall 4 and, at its end remote from the functional component which is not shown in FIG. 10 but which is identified by reference 23 in FIG. 7, it is provided with a groove 27 which extends therearound in the outside periphery thereof and which accommodates an O-ring seal. This embodiment also does not involve any closure for the opening in the tank wall but rather the opening communicates with a connection element 30 having a fixing base 31 with which it is suitably welded to the external surface of the tank wall 4. The connecting element 6 is provided with a plurality of peripherally arranged latching or detent springs 32 which each have a snap-engagement nose 7 for engaging behind the edge of the opening in the tank wall. Formed between the latching springs 32 and the wall of the connecting element 6 is a kind of annular space 33 into which a securing ring 34 is inserted. The embodiment shown in FIG. 10 therefore differs from that shown in FIG. 9 insofar as therein the end of the connecting element 6, which faces towards the outside of the fuel tank 1, is bevelled, whereas the fixing base 31 forms substantially on the longitudinal center line thereof a conical bell configuration which, together with the peripherally extending bevel on the connecting element 6, ensures self-centering of that component when the parts are assembled by machine and the component in question is welded in place.

Referring to FIG. 11, in the embodiment illustrated therein the part of the connecting element 6 which projects out of the fuel tank 1 is provided with a peripherally extending step or shoulder 35 on which an O-ring seal 28 rests. This part of the connecting element 6 is also provided with a peripherally extending bevel, for the reasons referred to above. The O-ring seal 28 seals off the connecting element 6 in relation to a cover cap 29 which is also provided with a connection element indicated at 30 in FIG. 11. In other respects the holding arrangement shown in FIG. 11 corresponds to that illustrated in FIG. 10. The cover cap 29 may for example also be formed from a multi-layer co-extrudate with an integrated barrier layer to provide a barrier action in relation to hydrocarbons.

It will be appreciated that the above-described embodiments of the invention have been set forth by way of example and illustration thereof and that various other modifications and alterations may be made therein without thereby departing from the spirit and scope of the invention.

What is claimed is:

1. A fuel tank of plastic material comprising a tank body having a tank body wall defining an opening, at least one holding means for fixing at least one functional component in the interior of the tank body, the holding means including at least one connecting element for supporting the functional component in the holding means, means for holding the connecting element in latching engagement to the tank body wall in the opening of the tank body wall in a position of passing therethrough, and an accessory member operatively associated with the opening in the tank body wall at the outside of the tank body and wherein the accessory member is operative to seal the opening at the outside of the tank body with respect to the atmosphere.

2. A fuel tank assembly as set forth in claim 1 wherein the accessory member is a closure member.

3. A fuel tank assembly as set forth in claim 1 wherein the accessory member is a cover cap.

4. A fuel tank assembly as set forth in claim 1 wherein the connecting element is a member which is produced separately from the functional component and is adapted to receive the functional component to support same.

5. A fuel tank assembly as set forth in claim 1 wherein the connecting element is in the form of a constituent part of the functional component.

6. A fuel tank as set forth in claim 1 wherein the accessory member is welded to the tank body wall.

7. A fuel tank as set forth in claim 1 wherein the connecting element has an outer periphery and at its outer periphery latching elements which in the position of installation engage behind the tank body wall in positively locking relationship.

8. A fuel tank as set forth in claim 7 wherein the connecting element is in the form of a substantially tubular member which has an open end and which at its outside periphery has resiliently yielding wall portions, wherein said latching elements are in the form of snap-engagement noses on said wall portions.

9. A fuel tank as set forth in claim 8 including a securing element fitted into the open end of the connecting element in the position of installation thereof, the securing element locking the latching elements in the position of engaging behind the tank body wall.

10. A fuel tank as set forth in claim 9 wherein the securing element is in the form of a spreading element insertable into the end of the connecting element.

11. A fuel tank as set forth in claim 1 and including at least one bracing means for axially fixing the connecting element in its position of installation.

12. A fuel tank as set forth in claim 11 wherein said accessory means comprises a cover cap and the cover cap includes said bracing means.

13. A fuel tank as set forth in claim 11 wherein said bracing means includes resilient support legs at the outside periphery of the connecting element and arranged to brace the connecting element in the position of installation thereof in a biased condition against the inside surface of the tank body wall.

14. A fuel tank as set forth in claim 11 wherein said bracing means includes a resilient support collar at the outside periphery of the connecting element and arranged to brace the connecting element in the position of installation thereof in a biased condition against the inside surface of the tank body wall.

15. A fuel tank as set forth in claim 11 wherein the bracing means includes a support plate, a support cover fitted into the open end of the connecting element, and a tie element connecting the support plate and the support cover in mutually co-operating relationship, the arrangement being such that the support plate is braced in a biased condition against the inside surface of the tank body wall the tie element.

16. A fuel tank as set forth in claim 15 wherein the tie element is a blind rivet.

17. A fuel tank as set forth in claim 15 wherein the support cover serves as a securing element.

18. A fuel tank as set forth in claim 15 wherein the support plate has an outside periphery and at its outside periphery on its side towards the inside of the tank body wall in the position of installation is provided with claws.

19. A fuel tank as set forth in claim 15 wherein the support plate has an outside periphery and at its outside periphery on its side towards the inside of the tank body wall in the position of installation is provided with claw-shaped extensions.

20. A fuel tank as set forth in claim 1 wherein the connection portion of the accessory member is in the form of a sleeve inserted into the connecting element, the sleeve having a peripherally extending collar portion as a fixing flange for a further connection portion.

* * * * *